Figure 1:
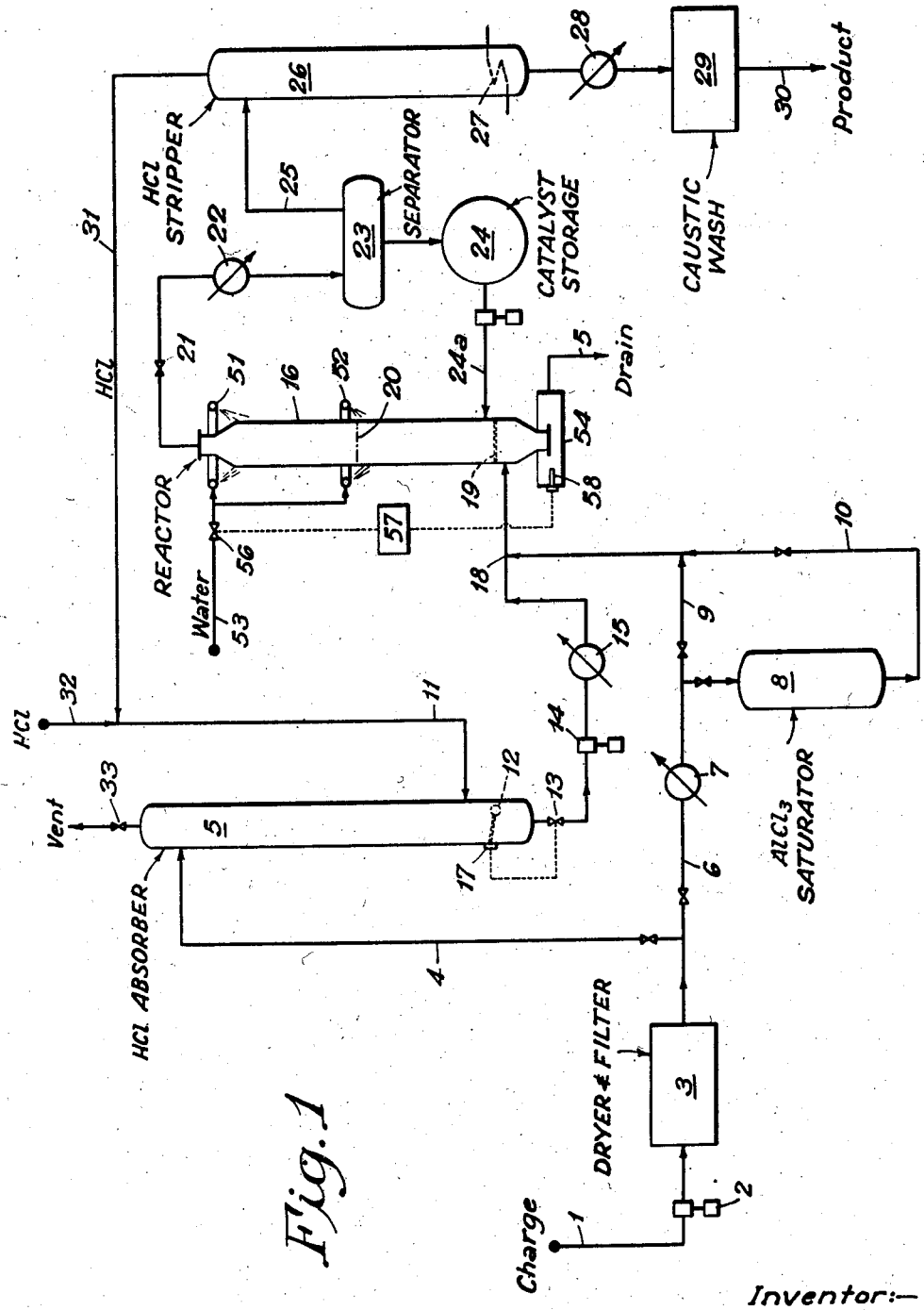

Sept. 28, 1948.   J. E. SEEBOLD   2,450,095
CORROSION PREVENTION
Filed March 27, 1945   2 Sheets-Sheet 2

Inventor:—
James E. Seebold
By Pike H. Sullivan
Attorney

Patented Sept. 28, 1948

2,450,095

UNITED STATES PATENT OFFICE 2,450,095

CORROSION PREVENTION

James E. Seebold, Chicago, Ill., assignor to Standard Oil Company, Chicago, Ill., a corporation of Indiana Application March 27, 1945, Serial No. 585,122

6 Claims. (Cl. 260—683.5)

This invention relates to corrosion reduction and prevention. More particularly it relates to a method and apparatus for reducing or preventing corrosion of materials when exposed to or contacted by substances under such temperature conditions that the substances are corrosive.

Corrosion is generally defined as a relatively slow chemical action resulting from environmental conditions causing the deterioration of materials of construction. Corrosion is particularly prevalent in the case of metallic materials but proceeds as well with non-metallic materials. Rates of corrosion vary widely. In some cases rather slow deterioration occurs, as in the case of steel exposed in a clean, relatively dry atmosphere, while in other cases very rapid destruction takes place, as in the case of steel exposed to dilute sulfuric acid. Corrosion prevention and the selection of materials to withstand corrosive action is particularly important in the chemical process industries, since these industries by their nature require the handling of substances of high chemical, and hence corrosive, activity. When conditions are such that rates of corrosion are slow, inexpensive, mechanically durable materials of construction, such as iron and steel, may be used and replaced as necessary when deterioration occurs. When more severe conditions are encountered, more expensive, and in some cases fragile materials must be used, such as ferrous alloys, non-ferrous alloys, plastics, ceramic ware, glass, cement lined steel, metals clad with alloy, glass or other corrosion resistant materials, carbon, etc. The use of these materials is to be avoided whenever possible since they are in many cases of limited availability, are usually expensive at first cost, and are costly to maintain and keep in working order, particularly in large scale installations. An example of a large scale installation presenting a difficult problem of corrosion can be cited in the petroleum industry where an extremely corrosive condition exists in the reactors used in the so-called "liquid phase" isomerisation of hydrocarbons; for example, normal butane to iso-butane, normal pentane to iso-pentane, n-$C_5$-$C_6$ hydrocarbons to iso-$C_5$-$C_6$ hydrocarbons, etc. These reactors, during the isomerization process, contain a mixture comprising principally hydrocarbons, halogen acids, e. g. hydrogen chloride, and a catalyst material which is a liquid complex of a metal halide, such as aluminum chloride, and hydrocarbons. In some isomerization processes hydrogen is also present in the reactor. This mixture is reacted at a reaction temperature, which is usually between 150° F. and 300° F., and at a reaction pressure which is usually between 100 pounds per square inch and 1000 pounds per square inch. Under these conditions reactors suffer severe corrosion. This is true even when the iron and steel reactors have been lined with some types of cement since the liners may be porous or become cracked and thus expose the retaining metal to the reaction mixture. In one type of isomerization reaction it was found necessary to shut down the reactors, for inspection and repair, at very close intervals. Certain alloy liners, which appear to stand up under these conditions, are frequently difficult to obtain, are quite costly, and in some cases do not stand up well mechanically.

It is therefore an object of this invention to provide an efficient, simple, and low cost method for reducing the corrosion of materials exposed to substances which have a corrosive action under the temperature conditions at which the exposure normally occurs. It is a further object of this invention to prevent such corrosion in metal reactors used for isomerization or other reactions in which halogen compounds; such as, metal halides, halogen acids, etc., are reactants. It is yet a further object of this invention to prevent such corrosion in an unheated container, conduit, or reactor, etc., and to effect a reduction or prevention of such corrosion without substantially lowering the temperature of the bulk of the substance below that which would affect the purpose for which the substance is primarily intended.

I have discovered that the corrosion, which occurs when a material is exposed to a substance under operating temperature conditions at which the substance is corrosive, can be substantially reduced or prevented by heat-insulating the material from the substance to maintain a temperature differential between the material and the substance and cooling the material to a temperature substantially below the temperature of the substance, or below that at which corrosion would normally take place. To better illustrate the operation of my invention, I shall give a detailed description of my method and apparatus for reducing the corrosion encountered in a butane isomerization reactor. So successful has been my process that butane isomerization reactors have been inspected after 1800 hours of continuous operation and have shown no signs of corrosion, whereas previously the corrosion and deterioration of metal reactors, even where glass-cloth liners were used, became very evident in less than 30 days.

Figure 2:
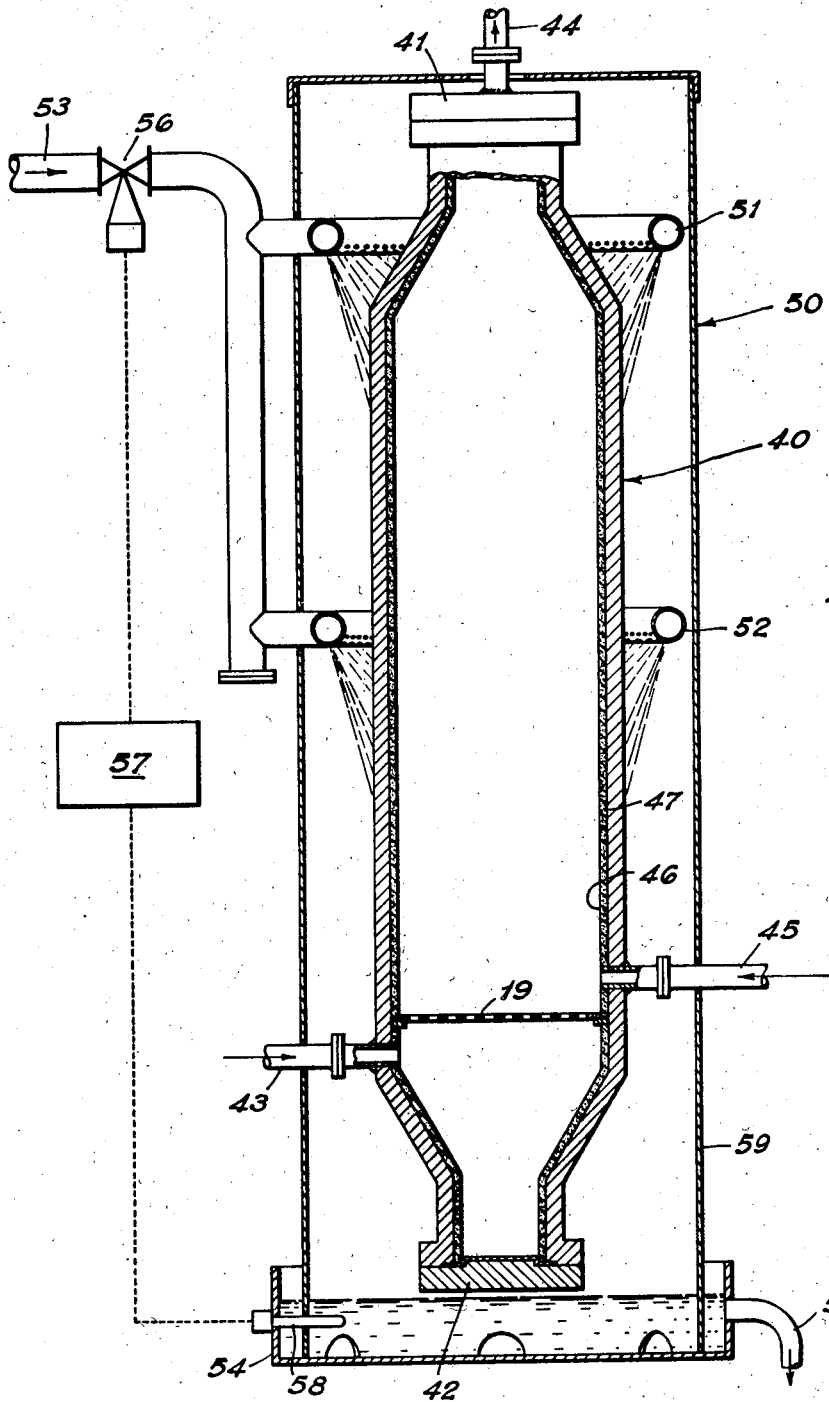

In the drawings which form a part of the specification, Figure 1 is a schematic flow sheet of a process for isomerizing normal butane hydrocarbons to the iso-structure, and Figure 2 is a diagrammatic, vertical section of a reactor suitable for use in the butane isomerization process and modified in accordance with my invention.

Referring now to Figure 1, a charge, consisting principally of n-butane, for example, about 90 to 100%, is pumped from source 1 through pump 2 and a dryer and filter 3. From the dryer a portion of the charge is carried by conduit 4 to a hydrogen chloride absorber 5. A second portion of the charge is carried by conduit 6 through a pre-heater 7, and it is then divided so that a portion passes through an aluminum chloride saturator 8 while the other portion goes through a by-pass 9 and joins with the first portion in conduit 10. The portion of the charge going to the absorber is usually about five times that portion going to the aluminum chloride saturator system. The ratio of the aluminum chloride saturator charge to that by-passed around it may be in the order of 1:1 to 1:2. These ratios may be varied over a wide range since they are dependent upon a number of variables; for example, the temperature of the charge, the desired concentration of hydrogen chloride and aluminum chloride in the reactor feed, etc.

The portion of the charge carried by conduit 4 to the hydrogen chloride absorber 5 flows down through the absorber counter-current to the hydrogen chloride introduced through line 11. By means of liquid level regulator 12 there is maintained at the base of the tower a body of liquid from which the hydrogen chloride saturated charge is pumped through control valve 13 by pump 14 through pre-heater 15 to the isomerization reactor 16. The liquid level is maintained by a suitable controller 17, acting on valve 13. The portion of the charge carried by conduit 10 which contains dissolved aluminum chloride is joined at 18 with the charge coming from the absorber, so that the charge to reactor 16 is a combined charge.

Within the reactor 16 there is a distributor plate 19, above which is maintained a liquid catalyst material comprising a complex of aluminum chloride with hydrocarbon; for example, iso-octane, kerosene, or the like. The charge enters the tower and bubbles up through the distributor plate, and is intimately mixed with the complex. At about half way up the tower there is an interface 20 between the complex and hydrocarbon mixture and the liquid reaction products which fill the rest of the tower above the interface. These reaction products are drawn overhead through a reduced pressure valve 21 and then through cooler 22 into a separator drum 23. From the separator drum any entrained catalyst is separated and drawn off into a catalyst storage 24. The remaining reaction products are carried by line 25 to a hydrogen chloride stripper 26. Usually the separator 23 is run full and a pump would not be required in line 25, but one may be used if necessary. In stripper 26 a heating coil 27 is provided which supplies heat for stripping the hydrogen chloride from the reaction products. The bottoms of the stripper are then drawn off through cooler 28 and a caustic wash 29. The product in conduit 30 is composed of approximately 30 to 40% iso-butane and 70 to 60% normal butane and may be fractionated if desired to obtain the iso-butane. The hydrogen chloride from the stripper is carried in conduit 31 to the hydrogen chloride absorber. When necessary, make-up hydrogen chloride from a source 32 may also be introduced into conduit 31. The gases from the hydrogen chloride absorber may be vented through a valve 33 to the air, since the absorber is operated under very efficient conditions with little loss of HCl.

The reactor 16, as illustrated in Figure 2, is constructed of a forged steel cylindrical shell 40, which is about 44 feet high and 4½ feet wide at the center, with a wall thickness of the shell of about 4 inches. The shell 40 is capped on each end with plates 41 and 42 in a suitable manner. Nipples 43, 44, and 45 provide access to the inside of the reactor and make suitable connections with the conduits carrying respectively the reactor charge, the reactor products, and the catalyst, carried to or from the catalyst storage 24 in conduit 24a. The nipple 45 is preferably located above the distributor plate 19 so that the hydrocarbons entering the reactor may bubble up through the catalyst. The conduits connected to the nipples are all lined with "Hastelloy," and these liners extend through the walls of the reactor.

The isomerization reaction is usually carried on at a reaction temperature of 150° F. or higher and preferably between about 200 to 250° F. The pressure in the reactor may be between 200 to 1000 pounds per square inch gage, and preferably between 350 to 450 pounds gage. The mixture in the reactor will contain an amount of hydrogen chloride in the range of about 1 to 10% of the butane by weight and preferably 3%. Aluminum chloride will be in the range of about 0.05 to .20 pound per barrel of charge to the reactor and preferably about .1.

The process and apparatus described is of a type presently in commercial use, and it is under the conditions described for this process that extreme corrosion of the reactor has occurred. Glass cloth liners did not stand up, and an alloy known in the trade as "Hastelloy" appeared at first to be satisfactory, but was not available in sufficient quantities to make an entire liner for the reactor, and was quite costly. Later experience with this alloy was discouraging in that it failed mechanically and was replaced with cement.

To heat-insulate the reactor in accordance with my invention, I provide a heat-insulating liner 46 which covers the entire inner surface 47 of the shell and is securely fitted around each of the "Hastelloy" liners extending from the nipples. This liner is preferably of a material known in the trade as "Gunite." This material is a mixture of hydrated cement, sand, and water of a suitable consistency for spraying. To install this liner, it is necessary to secure a metal lath on the inside of the shell after the shell has been sand-blasted and then to spray the cement mixture on to a thickness of about 2 inches. Other types of liners which are known to the trade may be used. One is a glass cloth liner, mentioned above, which usually comprises a liner of fiber glass covered on both sides with a cement sand mixture, and this combined sheeting being then placed against the wall of the shell and secured thereto by a primary coating of cement on the shell. These liners are usually of a thickness of ½ inch and are not as satisfactory a heat-insulator as is the "Gunite." Some liners available in the trade consist of a mixture of a furnace cement, sand, and asbestos bonded by glass. Others contain a fire brick and cement mixture.

To cool the reactor, I provide a cooling device 50 which comprises a pair of spray rings 51 and 52 adapted to spray water from source 53 on to the outer surface of the shell 40. The water runs down the surface of the shell and is collected in a pan 54 from which it is carried off by drain 55. The amount of water sprayed on the tower regulates the temperature of the shell and may be controlled by valve 56. Where close temperature control is desired, a valve-operating mechanism 57 which operates in response to a temperature indicated by a thermocouple 58 mounted in the pan 54 may be used. I have found it desirable to enclose the whole reactor, including the spray rings in a metal shield 59 so as to improve my control of the temperature by eliminating losses by splashing, wind, etc.

In practicing my invention, I prefer to maintain a temperature of the water collected in the pan 54 of between 80 to 100° F., although lower temperatures may be used. This in turn gives me a temperature at the surface 47 referred to as the skin temperature of between 90 to 125° F. The following temperatures are those recorded for reactors, during normal operation.

| Reactor | Type of lining | Oil Side, ° F. | | Skin Temp., ° F. | | |
|---|---|---|---|---|---|---|
| | | Bottom | Top | Top | Middle | Bottom |
| D-1A | Gunite | 213 | 206 | 110 | 87 | 93 |
| D-1B | Glasscloth | 215 | 189 | 125 | 90 | 100 |
| D-1C | Gunite | 215 | 207 | 115 | 94 | 96 |

Although these temperatures are typical, the invention may be practiced with reaction temperatures of 150° F. or higher and skin temperatures of 125° F. or lower. I prefer to obtain these skin temperatures by my combination of heat-insulation and cooling, but it is to be understood that any skin temperature obtained by my combination which is sufficiently low to substantially reduce or prevent corrosion is intended as being within the scope of my invention. It will be noticed from the temperatures indicated above that in the case of the Gunite-lined reactors, the reduction in temperature of the reaction mixture, i. e., the reaction temperature, is only a matter of 7 or 8° F. and in the case of the glass-lined reactor a matter of 26° F. It is seen that I have successfully maintained a temperature differential between the shell and the reactants while reducing the skin temperature to such a degree that corrosion is substantially prevented without substantially reducing the reaction temperature, and this is particularly true when my liner is of the Gunite type. For this reason my invention may be practiced where endothermic reactions are carried out in a reactor which is unheated except by the heat contained in the reacting substances entering the reactor.

While an exact explanation of the theoretical or chemical phenomena that take place cannot be given, it is believed that by cooling the shell and heat-insulating it from the mixture or substance which would ordinarily corrode the skin surface of the shell I have inhibited the corrosive action of any of the substances which penetrate the liner, either as liquids, vapors, or solids, and contact the skin. Isomerization reactors which have been in operation for as much as 1800 hours have been shut down and inspected. Numerous cracks have been found in the liners and absolute evidence of the reaction mixture filling these cracks and contacting the surface or skin of the shell has been obtained. In every case where my invention was in practice, there has been no sign of corrosion of the shell where these contacts have taken place. It is obvious from this evidence that my invention may be practiced by utilizing as a liner a substantially porous heat-insulating material when the substances in the reactor increase their viscosity at temperatures approaching the skin temperature of the shell so that they tend to fill up the pores of the liner and form with it a heat-insulating layer. I further contemplate as a method of heat-insulating within the scope of my invention the provision of a liner which is spaced from the shell to provide a heat-insulating gap, which liner may be pervious to the corrosive material during normal use, either because of porosity or cracking. In fact, it is contemplated that the provision in any manner of the layer of a heat-insulating medium adjacent the skin surface of the material which would normally corrode under operating conditions of temperature or of maintaining a temperature differential between the material and the normally corrosive substances so that the corrosive substances which contact the material may be cooled to the temperature at which the material is maintained is within the scope of my invention. For example, no liner need be provided in cases where the reacting substances have viscosities and viscosity-temperature coefficients such that a viscous layer of the reacting substance adheres to the cooled vessel wall to automatically form a heat-insulating layer.

In the preferred specific example described, the corrision prevented was that of a steel shell by a reaction mixture including hydrocarbons, halogen acid, e. g. hydrogen chloride, a metal halide, e. g. aluminum chloride, or other isomerization catalysts, and hydrocarbons, e. g. normal butane, and the reaction products. My invention has also been successfully practiced where hydrogen has been present in this reaction mixture. It is contemplated that other corrosive substances; such as, acids, bases, salts of acids or bases, halogen-containing materials, etc., may be inhibited in their corrosive effect upon conduits, containers, reactors, splash plates, etc., by utilizing the teachings of my invention. Furthermore, it is contemplated that the cooling of the material may be accomplished by other means than a water spray; for example, by evaporation of a film of water or other volatile liquid from the surface, by water jacketing or by the use of refrigerants.

Other advantages and variations within the spirit of my invention may occur to those skilled in the art, and therefore no limitations are intended other than those imposed by the scope of the following claims:

I claim:
1. A method for inhibiting corrosion of an inner surface of a metal reactor within which is reacted hydrocarbons and halogen-containing materials at a reaction temperature sufficient to cause isomerization of the hydrocarbons comprising lining the inner surfaces to be protected with a non-metallic material and spraying the corresponding outer surface of the reactor with water to maintain said inner surface at a temperature substantially below the reaction temperature whereby the corrosion is substantially inhibited.

2. The method of claim 1 wherein the non-metallic material is a cementitious mixture.

3. The method of claim 1 wherein the step of lining said inner surface includes the step of bonding a cementitious material to said inner surface.

4. The method of claim 1 wherein the temperature at which the inner surface of the metal reactor is maintained is below about 125° F.

5. The method of claim 4 wherein the reaction temperature is at least 150° F.

6. The method of claim 4 wherein the temperature of the inner surface of the metal reactor is maintained below about 125° F. by determining the temperature of the spray water leaving said outer surface of the reactor and regulating the quantity of the spray as a function of the temperature determined.

JAMES E. SEEBOLD.

REFERENCES CITED

The following references are of record in the file of this patent:

UNITED STATES PATENTS

| Number | Name | Date |
|---|---|---|
| 1,357,278 | Day | Nov. 2, 1920 |
| 1,387,080 | Smith | Aug. 9, 1921 |
| 1,599,360 | Hechenbleikner et al. | Sept. 7, 1926 |
| 1,757,855 | Chilowsky | May 6, 1930 |
| 1,948,391 | Montgomery et al. | Feb. 20, 1934 |
| 1,952,705 | Egloff et al. | Mar. 27, 1934 |
| 2,266,012 | D'Ouville et al. | Dec. 16, 1941 |
| 2,323,830 | McMillan | July 6, 1943 |

FOREIGN PATENTS

| Number | Country | Date |
|---|---|---|
| 468,729 | Great Britain | July 6, 1937 |